United States Patent

[11] 3,571,590

[72] Inventors Shinjiro Katagiri;
  Mamoru Nakano, Katsuta-shi, Japan
[21] Appl. No. 732,249
[22] Filed May 27, 1968
[45] Patented Mar. 23, 1971
[73] Assignee Hitachi, Ltd.
  Tokyo-To, Japan

[54] ELECTRON MICROSCOPE HAVING A COMPENSATION DEVICE FOR COMPENSATING THE DEVIATION OF A DIFFRACTION IMAGE
9 Claims, 5 Drawing Figs.

[52] U.S. Cl. .................................................... 250/49.5
[51] Int. Cl. ................................................. H01j 37/26
[50] Field of Search ...................................... 250/49.5(1), 49.5(4)

[56] References Cited
UNITED STATES PATENTS

| | | | |
|---|---|---|---|
| 2,973,433 | 2/1961 | Kramer ........................ | 250/49.5 |
| 3,090,864 | 5/1963 | Takahashi et al. ........... | 250/49.5 |
| 3,225,192 | 12/1965 | Katagiri et al. ............... | 250/49.5 |
| 3,371,206 | 2/1968 | Takizawa ...................... | 250/49.5 |

Primary Examiner—William F. Lindquist
Attorney—Craig, Antonelli, Stewart & Hill

ABSTRACT: An electron microscope wherein deflecting coils disposed between an objective lens and an intermediate lens are provided to compensate for the deviation of the diffraction image of a specimen by adjusting the deflecting magnetic field which is produced by the deflecting coils to which exciting currents proportional to an exciting current of the intermediate lens are applied.

PATENTED MAR 23 1971 3,571,590
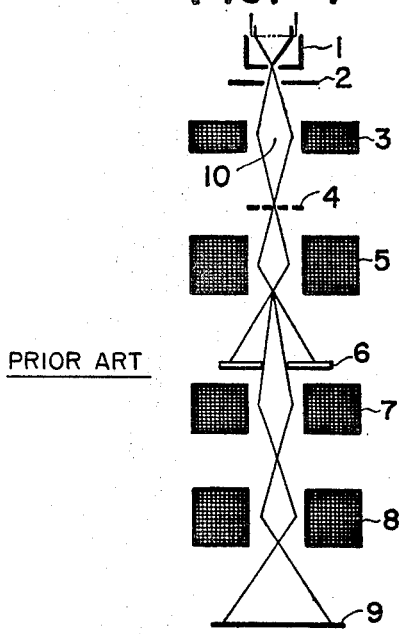
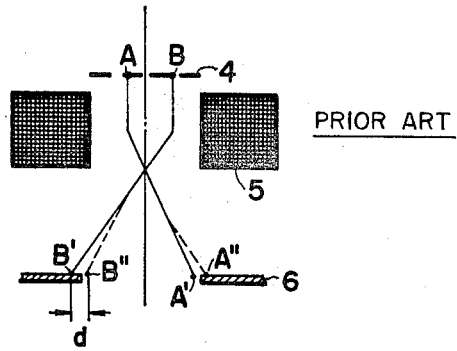
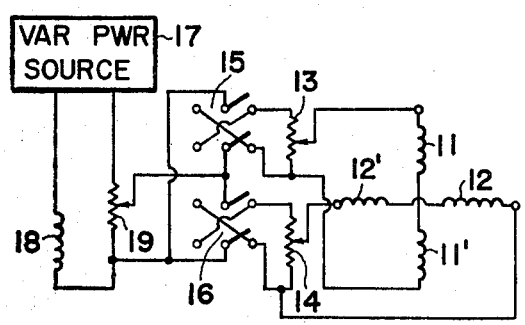
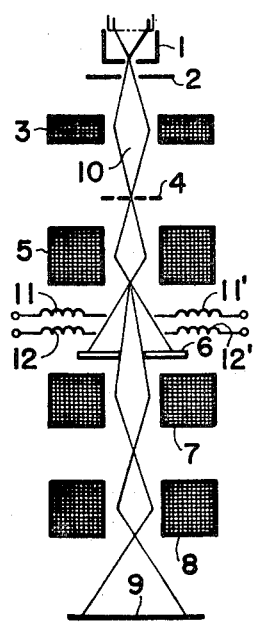
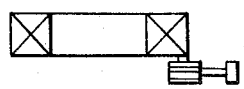
INVENTORS
SHINJIRO KATAGIRI
MAMORU NAKANO
BY Craig & Antonelli
ATTORNEYS

ELECTRON MICROSCOPE HAVING A COMPENSATION DEVICE FOR COMPENSATING THE DEVIATION OF A DIFFRACTION IMAGE

This invention relates to an electron microscope which permits observation of a microscope image and a diffraction image and, more specifically, to an electron microscope having a compensation device for compensating for undesirable spurious deviation of the diffraction image.

In prior art electron microscopes, difficulty has been encountered in accurately forming the diffraction image due to a spureous deviation of the image prior to the intermediate lens. Accordingly, it is a primary object of the present invention to provide means for eliminating or effectively dynamically counteracting these undesirable deviation effects.

This object of the invention is realized by provision in the microscope of a compensation device comprising deflecting coils disposed between an objective lens and an intermediate lens, means for supplying an exciting current to the deflecting coils proportional to the exciting current of the intermediate lens, means for varying the exciting current supplied to the deflecting coils, and means for changing the polarity of the exciting current of the deflecting coils or means for rotating the deflecting coils.

Other and further objects of the invention will be apparent from the following description, taken in connection with the accompanying drawings, wherein:

FIG. 1 is a schematic diagram showing the lens system of a conventional electron microscope;

FIG. 2 is a diagram showing the deviation of a diffraction image in a conventional electron microscope;

FIG. 3 is a circuit diagram showing an embodiment of this invention;

FIG. 4 is a schematic diagram showing the lens system including said embodiment; and FIG. 5 schematically illustrates a rotatable coil.

A conventional electron microscope which permits observation of a microscope image and a diffraction image suitably has a lens system, for example, as shown in FIG. 1. In the FIG., reference numeral 1 indicates an electron source, which propagates an electron beam 10 on a path along which is disposed in order, an anode 2, a focusing lens 3, a specimen 4, an objective lens 5, an intermediate field limiting aperture 6, an intermediate lens 7, a projection lens 8, and a fluorescent screen 9.

The electron beam 10 emitted from electron source 1 penetrates through specimen 4 and forms an image of the specimen on fluorescent screen 9. It is well known that, in this case, the microscope image or the diffraction image can be observed by varying the focal length of intermediate lens 7 through suitable adjustment of the exciting current therefor, as described in detail, for example, in U.S. Pat. No. 3,225,192.

Here in order to form the diffraction image, it is necessary to vary the focal length of the intermediate lens after the field view of the microscope image has been restricted to a desired range through use of the field limiting aperture 6.

With a conventional electron microscope of the type above described, however, any change of the focal length of intermediate lens 7 will cause a disadvantageous deviation of the diffraction image and make it impossible to obtain a diffraction image corresponding to the desired limited field of view.

This is explained by the fact that, as will be clear from FIG. 2, even if the field of view of image $A^1$-$B^1$ of points A-B on the specimen 4 is limited by field limiting aperture 6, if the focal length of the intermediate lens is changed by increasing the exciting current thereto in order thereby to obtain a diffraction image corresponding to the limiting field of view, the image $A^1$-$B^1$ is seen to deviate by a distance $d$ to position $A''$-$B''$ with the result that undesirable inaccuracies are introduced.

This deviation of the diffraction image is ascribable to the leakage magnetic field which is present in the region between objective lens 5 and intermediate lens 7. In this case the variation of the exciting current of objective lens 5 is so small that the component of leakage magnetic field produced thereby is kept almost constant and may be regarded as having practically no adverse effect toward the deviation of the diffraction image. It therefore appears that what is primarily responsible for this deviation is the variation of the component of leakage magnetic field leaking out from intermediate lens 7. Thus, it follows that if the exciting current for the intermediate lens 7 is varied in order to obtain the diffraction image, the leakage magnetic field is also varied accordingly, resulting in the above mentioned deviation.

Referring to FIG. 3, deflecting coils 11 and 11' providing X-direction deflection, and deflecting coils 12 and 12' providing Y-direction deflection, are connected respectively to variable resistors 13 and 14 for adjusting the exciting currents of the respective deflecting coils, and switches 15 and 16 for changing the polarity of the exciting currents of respective deflecting coils.

It was learned after research that the deviation quantity $d$ of the diffraction image is proportional to the exciting current for the intermediate lens. Therefore, the deflecting coils are arranged between objective lens 5 and intermediate lens 7 as shown in FIG. 4 and, in order to supply an exciting current for the intermediate lens 7, a variable resistor 19 is interposed in the exciting circuit for supplying the exciting current from a variable power source 17 to the coil 18 of intermediate lens 7, and switches 15, 16 are connected to both ends of resistor 19.

With such a construction, the magnetic field in the X-and Y-directions produced by the respective deflecting coils are combined together, and this composite magnetic field acts upon the electron beam. The direction of this composite magnetic field can be shifted as desired over a range of 360° by adjusting the variable resistors 13 or 14 and suitably changing over the switch 15 or 16 for altering the polarity of magnetic field. Moreover, the magnitude of this composite magnetic field can be varied with the adjustment of variable resistor 19.

If, therefore, the composite magnetic field is adjusted to have the direction in which the leakage magnetic field above described can be cancelled and the magnitude is made equal to that of the leakage magnetic field, then the leakage magnetic field may be completely eliminated and the object of the present invention to compensate for the deviation of the diffraction image which is attributable to the leakage magnetic field may be realized.

After the exciting current for the intermediate lens is varied so as to obtain the diffraction image, the above adjustments are effected until the diffraction image comes to exactly correspond to the desired limiting field of view while observing the image on the fluorescent screen.

In the embodiment described two pairs of deflecting coils for deflection in the X-and Y-directions are used for electrically varying the direction of the composite magnetic field for compensation, but if either pair of the coils 11, 11' or 12, 12' is constructed mechanically to be rotatable over 360°, as seen in FIG. 5, the function and effect above described is obtained with only one pair of coils without the variable resistors 13, 14 and switches 15, 16.

Also, in this embodiment the exciting current for the deflecting coils is obtained from the variable power source 17 of the intermediate lens, it is, however, possible to provide another separate variable power source for supplying exciting current to the deflecting coils so constructed that the exciting current for the deflecting coils may be adjusted simultaneously in cooperation with the adjustment of the exciting current for the intermediate lens.

We have shown and described several embodiments in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are encompassed by the scope of the appended claims.

We claim:

1. In an electron microscope having in alignment in the following order along an electron beam path at least a source of electrons, an anode, a condenser lens, means for supporting a specimen, an objective lens, a field limiting aperture, an intermediate lens, a projection lens, and a fluorescent screen, a variable power source for supplying an exciting current to the intermediate lens, and means for varying the exciting current of the intermediate lens so as to selectively produce a microscope image and a diffraction image of the specimen on the fluorescent screen, the improvements which comprise:

deflecting coils disposed between the objective lens and the intermediate lens for generating a composite magnetic field capable of compensating for any leakage magnetic field from the intermediate lens which causes diffraction image deviation;

means connected to said power source for supplying exciting currents proportional to the exciting current of the intermediate lens to the deflecting coils;

means for adjusting the amplitude of the exciting currents of the deflecting coils so as to vary the amplitude of the composite magnetic field; and means for changing the polarity of the exciting currents of the deflecting coils so as to change the direction of the composite magnetic field produced by the deflecting coils.

2. In an electron microscope having in alignment in the following order along an electron beam path at least a source of electrons, an anode, a condenser lens, means for supporting a specimen, an objective lens, a field limiting aperture, an intermediate lens, a projection lens, and a fluorescent screen, a variable power source for supplying an exciting current to the intermediate lens so as to selectively produce a microscope image and a diffraction image of the specimen on the fluorescent screen, the improvements which comprise:

deflecting coils disposed between the objective lens and the intermediate lens for generating a composite magnetic field capable of compensating for any leakage magnetic field from the intermediate lens which causes diffraction image deviation;

means connected to said power source for supplying an exciting current proportional to the exciting current of the intermediate lens to the deflecting coils;

means for adjusting the amplitude of the exciting current of the deflecting coils so as to vary the amplitude of the composite magnetic field; and means for rotating the deflecting coils so as to change the direction of the composite magnetic field produced by the deflecting coils.

3. In an electron microscope having aligned in order at least a source of electrons, an anode for accelerating electrons from the source, a condenser lens, means for supporting a specimen, an objective lens, a field limiting apertured electrode, an intermediate lens, a projection lens, and a fluorescent screen, a variable power source for supplying an exciting current to the intermediate lens, and means for varying the exciting current of the intermediate lens so as to selectively produce a microscope image and a diffraction image of the specimen on the fluorescent screen, the improvements which comprise:

X-deflecting coils disposed between the objective lens and the intermediate lens for providing an X-direction deflection magnetic field;

Y-deflecting coils disposed perpendicular to the X deflecting coils for providing a Y-direction deflection magnetic field;

means connected to said power source for supplying exciting currents proportional to the exciting current of the intermediate lens to said X-and Y-deflecting coils so that the X-and Y-direction deflection magnetic fields of the X-and Y-deflection coils produce a composite magnetic field; and shifting means for shifting the composite magnetic field as desired over a range of 360° to thereby compensate any leakage magnetic field from the intermediate lens which causes diffraction image deviation.

4. The combination defined in claim 3, which further comprises first adjusting means for adjusting the amplitude of the composite magnetic field, 5. The combination defined in claim 3, wherein said shifting means includes adjusting means for adjusting the amplitude of the respective exciting currents supplied to the respective X- and Y-deflecting coils and switching means for changing the polarity of the respective exciting currents so as to reverse the direction of the composite magnetic field.

6. The combination defined in claim 3, wherein either one of the X-and Y-deflecting coils are constructed mechanically to be rotatable over 360° and said shifting means includes rotating means for rotating the X-deflecting coils.

7. In an electron microscope having means for supporting a specimen, an electron beam generator for projecting to said specimen an electron beam, a field limiting apertured electrode, an objective lens disposed between said specimen supporting means and said apertured electrode, a fluorescent screen onto which an image of the specimen is projected, an intermediate lens disposed between said apertured electrode and said screen, a projection lens disposed between said intermediate lens and said screen, a variable power source for generating a variable exciting voltage, and coupling means for coupling said exciting voltage to said intermediate lens to cause an exciting current to flow through the intermediate lens, said coupling means operatingly varying the exciting current so as to selectively produce either of a microscope image and a diffraction image of the specimen on the screen, the improvement which comprises:

a compensation lens disposed between the objective lens and the intermediate lens;

means connected to said power source for supplying a compensation exciting current proportional to the exciting current of the intermediate lens to said compensation lens so that said compensation lens generates a compensative magnetic field between said objective lens and said intermediate lens; and adjusting means for varying the compensation exciting current to thereby compensate for a leakage magnetic field produced by said intermediate lens which causes diffraction image deviation with said compensation magnetic field.

8. The combination defined in claim 7, wherein said compensation lens includes two pairs of deflection coils orthogonally arranged to each other at a position between said objective lens and said intermediate lens and supplied with the compensation exciting current respectively to provide a composite compensation magnetic field.

9. The combination defined in claim 8, wherein said adjusting means includes a first and a second adjusting means for varying the amplitudes of the compensative exciting currents flowing through the respective pairs of the deflection coils, respectively.